US012662621B1

(12) United States Patent
Rabie et al.

(10) Patent No.: US 12,662,621 B1
(45) Date of Patent: Jun. 23, 2026

(54) COMPOSITIONS AND METHODS OF USE OF VISCOELASTIC SURFACTANTS AND NANOPARTICLES FOR HIGH TEMPERATURE WATER CONFORMANCE APPLICATIONS

(71) Applicant: Schlumberger Technology Corporation, Sugar Land, TX (US)

(72) Inventors: Ahmed Rabie, Sugar Land, TX (US); Alvinda Sri Hanamertani, Sugar Land, TX (US); Christopher Daeffler, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/287,101

(22) Filed: Jul. 31, 2025

(51) Int. Cl.
*C09K 8/584* (2006.01)
*C09K 8/592* (2006.01)
*E21B 33/138* (2006.01)

(52) U.S. Cl.
CPC .............. *C09K 8/584* (2013.01); *C09K 8/592* (2013.01); *E21B 33/138* (2013.01); *C09K 2208/10* (2013.01); *C09K 2208/30* (2013.01)

(58) Field of Classification Search
CPC .... C09K 8/584; C09K 8/592; C09K 2208/10; C09K 2208/30; E21B 33/138
See application file for complete search history.

(56) References Cited

U.S. PATENT DOCUMENTS

| | | | | |
|---|---|---|---|---|
| 10,407,606 | B2 | 9/2019 | Li | |
| 10,947,442 | B2 | 3/2021 | Ali | |
| 11,981,857 | B1 * | 5/2024 | Saleh | C09K 8/206 |
| 2016/0168443 | A1 * | 6/2016 | Lafitte | C04B 20/1029 507/112 |
| 2020/0291290 | A1 * | 9/2020 | Lafitte | C09K 8/602 |

FOREIGN PATENT DOCUMENTS

| | | | | |
|---|---|---|---|---|
| WO | WO-2021071952 A1 * | 4/2021 | | C09K 8/602 |

* cited by examiner

*Primary Examiner* — Crystal J Lee
(74) *Attorney, Agent, or Firm* — Jeffrey D. Frantz

(57) ABSTRACT

A viscoelastic fluid composition includes a viscoelastic surfactant composition ranging from about 0.1 wt. % to about 10 wt. % based on a total wt. % of the viscoelastic fluid composition. The viscoelastic fluid composition further includes crystalline sodium sulfate cellulose (NaSC) nanoparticles ranging from about 0.1 wt. % to about 10 wt. % based on the total wt. % of the viscoelastic fluid composition.

21 Claims, 5 Drawing Sheets

COMPOSITIONS AND METHODS OF USE OF VISCOELASTIC SURFACTANTS AND NANOPARTICLES FOR HIGH TEMPERATURE WATER CONFORMANCE APPLICATIONS

BACKGROUND

The present disclosure generally relates to compositions and mixtures of viscoelastic surfactants and nanoparticles as treatment fluids for hydrocarbon production from a subterranean formation.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admission of prior art.

Hydrocarbon fluids, such as oil and natural gas, are vital resources that are utilized to meet the global energy demand. Hydrocarbon fluids are obtained from a subterranean geological formation, commonly referred to as a reservoir, by drilling a well that penetrates the hydrocarbon-bearing formation. Once a wellbore is drilled, various forms of well completion components may be installed and/or techniques may be implemented to control and enhance the efficiency of producing various fluids from the reservoir. Primary recovery methods such as natural production from a gas-drive reservoir, generate 10-20% of oil in place (OIP). Given the inefficient recovery associated with primary recovery methods, additional recovery methods are often utilized to increase recovery of the hydrocarbon fluids.

Secondary recovery methods can increase the recovery of the hydrocarbon fluids to 25-35%, during which water or gas is injected through injection wells into the reservoir to maintain reservoir pressure and displace hydrocarbons towards the wellbore. Relatedly, tertiary methods, such as enhanced recovery methods including chemical flooding, thermal methods, and/or biological methods, can increase the recovery to 40-45% by restoring formation pressure and improving oil displacement or fluid flow in the reservoir. For example, during chemical flooding, injection wells inject fluids in the reservoirs to facilitate sweeping hydrocarbons to production wells. However, reservoirs formations are complex in nature due to the presence of various natural fractures, channels, fissures, or high permeability strikes, which may reduce oil recovery. For example, injected fluid distribution is unfavored in the presence of high permeability strikes, which may break through the producing wells, thereby leaving oil zones unswept. Accordingly, there is presently a need for water conformance methods to plug high permeability layers such that subsequent injections of the treatment fluid are diverted to low-permeability zones to increase oil recovery.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a viscoelastic fluid composition includes a viscoelastic surfactant composition ranging from about 0.1 wt. % to about 10 wt. % based on a total wt. % of the viscoelastic fluid composition. The viscoelastic fluid composition also includes crystalline sodium sulfate cellulose (NaSC) nanoparticles ranging from about 0.1 wt. % to about 10 wt. % based on the total wt. % of the viscoelastic fluid composition.

In an embodiment, a method includes mixing a viscoelastic surfactant composition and NaSC nanoparticles to form a viscoelastic fluid composition including the viscoelastic surfactant composition ranging from about 0.1 wt. % to about 10 wt. % based on a total wt. % of the viscoelastic fluid composition, and the NaSC nanoparticles ranging from about 0.1 wt. % to about 10 wt. % based on the total wt. % of the viscoelastic fluid composition. The method also includes providing the viscoelastic fluid composition to a wellbore to treat a subterranean formation.

In an embodiment, a system includes one or more vessels disposed in a subterranean formation, wherein the one or more vessels contain a viscoelastic fluid composition including a viscoelastic surfactant composition ranging from about 0.1 wt. % to about 10 wt. % based on a total wt. % of the viscoelastic fluid composition, and crystalline sodium sulfate cellulose (NaSC) nanoparticles ranging from about 0.1 wt. % to about 10 wt. % based on the total wt. % of the viscoelastic fluid composition.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
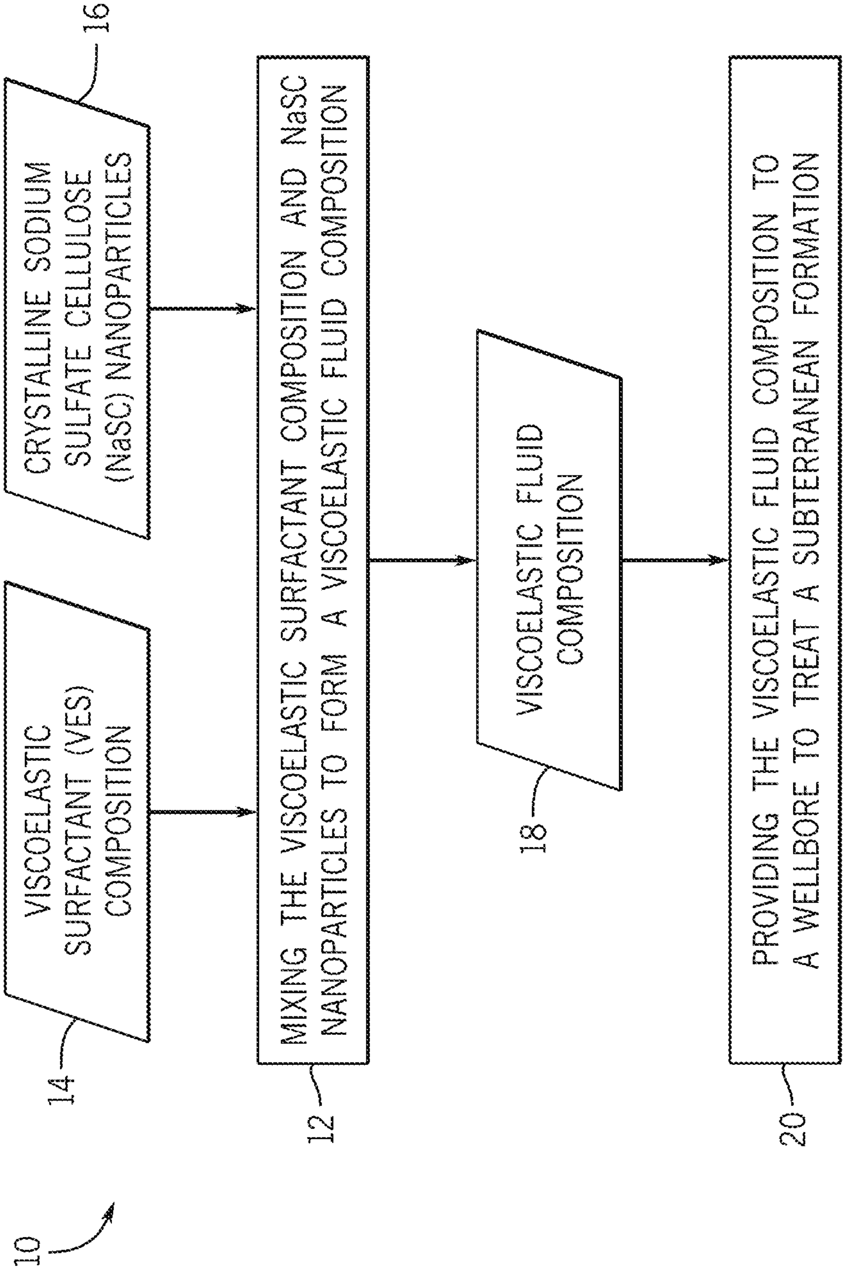
FIG. 1 is a flow diagram of a process for generating viscoelastic fluid compositions, in accordance with the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Additionally, it should be understood that references to "one embodiment" or "an embodiment" of the present disclosure are not intended to be interpreted as excluding the existence of additional embodiments that also incorporate the recited features.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to describe certain embodiments more clearly.

In addition, as used herein, the term "substantially similar" may be used to describe values that are different by only a relatively small degree relative to each other. For example, two values that are substantially similar may be values that are within 10% of each other, within 5% of each other, within 3% of each other, within 2% of each other, within 1% of each other, or even within a smaller threshold range, such as within 0.5% of each other or within 0.1% of each other.

As referred to herein, "substantially free of" or "substantially free from" refers to either the complete absence of a component or includes a minimal amount of the component, such as an impurity or unintended byproduct of another ingredient. For example, a composition and/or a mixture that is "substantially free" of a component may refer to a composition that includes less than about 0.01%, 0.025%, 0.05%, 0.075%, 0.1%, 0.5%, or 1%, or even 0%, by weight of the composition, of the component.

The terms "formation" or "subterranean formation" as utilized herein should be understood broadly, and are used interchangeably. A formation includes any underground fluidly porous formation, and can include without limitation any oil, gas, condensate, mixed hydrocarbons, paraffin, kerogen, water, and/or $CO_2$ accepting or providing formations. A formation can be fluidly coupled to a wellbore, which may be an injector well, a producer well, and/or a fluid storage well. The wellbore may penetrate the formation vertically, horizontally, in a deviated orientation, or combinations of these. The formation may include any geology, including at least a sandstone, limestone, dolomite, shale, tar sand, and/or unconsolidated formation. The wellbore may be an individual wellbore and/or a part of a set of wellbores directionally deviated from a number of close proximity surface wellbores (e.g. off a pad or rig) or single initiating wellbore that divides into multiple wellbores below the surface.

The term "oilfield treatment fluid" or "treatment fluid" as utilized herein should be understood broadly. In certain embodiments, an oilfield treatment fluid includes any fluid having utility in an oilfield type application, including a gas, oil, geothermal, or injector well. In certain embodiments, an oilfield treatment fluid includes any fluid having utility in any formation or wellbore described herein. In certain embodiments, an oilfield treatment fluid includes a water conformance fluid, a matrix acidizing fluid, a wellbore cleanup fluid, a pickling fluid, a near wellbore damage cleanup fluid, a surfactant treatment fluid, an unviscosified fracture fluid (e.g. slick water fracture fluid), and/or any other fluid consistent with the fluids otherwise described herein.

All numerical values within the detailed description herein are modified by "about" the indicated value, and take into account experimental error and variations that would be expected by a person having ordinary skill in the art. For example, "about" or "approximately" may refer to ±0.5%, ±1%, ±2, ±5%, ±10%, or ±15%.

Due to the presence of various geological zones/formations (e.g., natural fractures, channels, fissures, high permeability strikes) within a wellbore, various recovery techniques are employed to improve hydrocarbon fluid recovery. For example, conformance control methods (e.g., water conformance control fluids) may be utilized to plug high permeability zones such that subsequent injections of treatment fluids can be directed to areas (e.g., low-permeability zones) to improve oil recovery. Conformance control fluids may include chemicals such as cross-linked polymers, resins, performed particles gels, and/or hydrogels. These fluids are non-selective and may plug any type of zone (e.g., oil zone, water zone). Due to their non-selective behavior, the chemical fluids are delivered into a wellbore via a directed delivery method, such as via coil tubing. For example, the chemical fluids may be injected by bull heading from the surface, which allows the fluid to invade all zones and layers (e.g., water and oil). However, the use of coil tubing may be associated with complexity and incur additional costs during tertiary recovery methods. Accordingly, it may be desirable to develop water conformance fluids that selectively plug geographical zones within reservoirs to improve oil recovery.

The present disclosure is related to viscoelastic fluid compositions that include viscoelastic surfactants (VES) supported with nanoparticles (e.g., cellulose nanoparticles such as crystalline sodium sulfate cellulose (NaSC) nanoparticles) as selective water conformance fluids to promote sweeping efficiency and increase oil recovery. For example, the VES may be present in an amount ranging from 0.1 to 10 wt. % based on a total weight of the viscoelastic fluid composition, and the NaSC nanoparticles may be present in an amount ranging from 0.1 to 10 wt. % based on a total weight of the viscoelastic fluid composition. The combination of the VES and the nanoparticles in the viscoelastic fluid composition provides a synergistic effect such that the viscoelastic fluid composition exhibits high viscosity with gel-like characteristics. The viscoelastic fluid composition exhibits high viscosity due to the presence of micelles (e.g., wormlike micelles, cylindrical micelles), which is a three-dimensional (3D) network of micelles, that facilitates the reduction in the movement of water when combined with nanoparticles. Without wishing to be bound by theory, it is believed that the presence of nanoparticles facilitates non-covalent interactions (e.g., van der Waals forces, hydrogen bonding, electrostatic interactions) between the nanoparticles and the 3D network of the micelles, thereby improving the viscosity properties of the viscoelastic fluid composition. Accordingly, the viscoelastic fluid compositions described herein present advantages at surface conditions and down-hole conditions when utilized as a water conformance fluid (e.g., water shut-off).

In certain embodiments, the viscoelastic fluid composition may exhibit a low viscosity at surface conditions, thereby facilitating pumping process via one or more vessels. For example, the viscoelastic fluid composition may exhibit a viscosity ranging from about 0.1 cP to about 50 cP at surface conditions (e.g., room temperature such as about 25° C.). For example, the viscoelastic fluid may exhibit a viscosity that is similar in properties as water (e.g., about less than 3 cP, about less than 2 cP, such as about 1 cP). The viscoelastic fluid composition, when provided in a wellbore, may form its 3D network in the presence of additional factors, such as increasing salinity and temperature in down-hole conditions. Accordingly, the viscoelastic fluid composition may be advantageously utilized at bottom hole temperatures to plug an undesirable zone. Additionally, the viscoelastic fluid compositions described herein can selectively target certain zones/fluids due to the inherent characteristics imparted by the presence of VES (e.g., wormlike micellar structure). That is, the micellar structures may break down when contacting hydrophobic phases such as crude oil in the wellbore, thereby demonstrating its effectiveness in advantageously plugging undesirable zones (e.g., high permeability zones) and having minimal effects on the desired hydrocarbon fluid products (e.g., crude oil). In any case, the viscoelastic fluid compositions and their corresponding viscosity properties described herein advantageously increase oil efficiency in a wellbore due to the synergy between VES and nanoparticles.

Viscoelastic Fluid Compositions

With the foregoing in mind, FIG. 1 is a flow diagram of a process 10 for generating viscoelastic fluid compositions, in accordance with the present disclosure. It should be noted that the example process 10 shown in FIG. 1 is not limiting, and the process 10 may include additional or fewer blocks than those illustrated. Further, the process 10 may include block that are performed in an alternative order to that illustrated. That is, certain blocks may be performed before, after, or concurrently to/with another respective step.

Referring to the process 10, at block 12, a viscoelastic surfactant (VES) composition 14 and nanoparticles 16 are mixed to form a viscoelastic fluid composition 18. For example, the VES composition 14 and the nanoparticles 16 may be co-fed into a vessel or fed or otherwise provided separately into the vessel. In certain embodiments, the VES composition 14 and the nanoparticles 16 may be mixed in the presence of a solvent (e.g., water) at room temperature (e.g., 25° C.).

In certain embodiments, the VES composition 14 may be provided to the vessel in an amount ranging from about 0.1 weight (wt. %) to about 10 wt. % of the total amount of the viscoelastic fluid composition 18, such as about 0.5 wt. % to about 9 wt. %, about 1 wt. % to about 8 wt. %, about 1 wt. % to about 4 wt. %, about 1 wt. % to about 3 wt. %, about 0.5 wt. % to about 2 wt. %, or about 0.1, about 0.25, about 0.5, about 0.75, about 1, about 1.5, about 2, about 2.5, about 3, about 3.5, about 4, about 4.5, about 5, about 5.5, about 6, about 6.5, about 7, about 7.5, about 8, about 8.5, about 9, about 9.5, or about 10 wt. %.

In certain embodiments, the VES composition 14 may be selected from a group consisting of betaines, modified betaines, alkylamidobetaines, sultaines, modified sultaines, alkylamidopropyl sultaines, and combinations thereof. For example, the VES composition 14 may include a viscoelastic surfactant according to Formula (1):

(I)

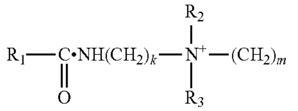

In certain embodiments, $R_1$ of formula (I) may be a saturated or unsaturated hydrocarbon group ranging from 1 to 29 carbon atoms or 10 to 24 carbon atoms, such as 2, 4, 6, 8, 10, 12, 14, 16, 18, 20, 22, 24, 26, or 28 carbon atoms. In certain embodiments, $R_1$ may be 16 carbon atoms. In other embodiments, $R_1$ may be 22 carbon atoms. In further embodiments, $R_1$ may be restricted to a single chain length or may be of mixed chain length such as those groups derived from natural fats and oils or petroleum stocks. The natural fats and oils or petroleum stocks may comprise tallow alkyl, hardened tallow alkyl, rapeseed alkyl, hardened rapeseed alkyl, tall oil alkyl, hardened tall oil alkyl, coco alkyl, oleyl, erucyl, soya alkyl, or combinations thereof.

In certain embodiments, each $R_2$ and $R_3$ of formula (I) may be independently selected from a group consisting of a hydrogen atom, straight chain alkyl (e.g., methyl group, ethyl group, propyl group, butyl group), branched alkyl, or hydroxyalkyl group ranging from 1 to 6 carbon atoms, such as from 1 to 5 carbon atoms, 1 to 4 carbon atoms, or 1 to 3 carbon atoms. In formula (I), k is an integer ranging from 1 to 20, 1 to 12, or 2 to 4. In formula (I), m is an integer ranging from 1 to 20, 1 to 12, 2 to 4, or 1 to 3. In some embodiments, formula (I) may represent a mixture of the VES composition 14. As such, k and/or m may represent an average number of carbon atoms (e.g., $CH_2$) groups. For example, k may range from 1 to 20, 1 to 12, or 2 to 4. Several specific, non-limiting examples of formula (I) are described below as VES-1 and VES-2.

In certain embodiments, formula (I) may be a VES such as erucic sulfobetaine (e.g., VES-1) with following chemical formula:

(VES-1)

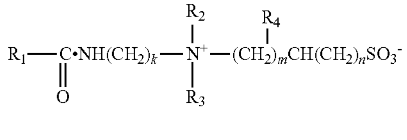

In VES-1, $R_1$ may be a saturated or unsaturated hydrocarbon group ranging from 1 to 29 carbon atoms or 10 to 24 carbon atoms, such as 2, 4, 6, 8, 10, 12, 14, 16, 18, 20, 22, 24, 26, or 28 carbon atoms. In certain embodiments, $R_1$ may be 22 carbon atoms. In further embodiments, $R_1$ may be a restricted to a single chain length or may be of mixed chain length such as those groups derived from natural fats and oils or petroleum stocks. For example, $R_1$ may be an erucyl group.

In VES-1, each $R_2$ and $R_3$ may be independently selected from a group consisting of a straight chain alkyl (e.g., methyl group, ethyl group, propyl group, butyl group), branched alkyl, or hydroxyalkyl group ranging from 1 to 6 carbon atoms, such as from 1 to 5 carbon atoms, 1 to 4 carbon atoms, or 1 to 3 carbon atoms. Preferably, $R_2$ and $R_3$ are methyl groups. In certain embodiments, $R_4$ is selected from a group consisting of hydrogen atom, hydroxyl, alkyl, or hydroxyalkyl groups ranging from 1 to 4 carbon atoms, wherein the alkyl groups may be selected from a group consisting of methyl, ethyl, propyl, butyl, hydroxyethyl, hydroxyl, methyl, etc.

In certain embodiments, VES-1 includes k, wherein k is an integer ranging from 1 to 20, 1 to 12, or 2 to 4. One or more carbon atoms of the carbon chain with k number of carbon atoms may be saturated or unsaturated. In VES-1, m is an integer of from 1 to 20, 1 to 12, 1 to 6, or from 1 to 3. In VES-1, n is an integer of from 0 to 20, 0 to 12, 0 to 6, or from 0 to 1. In certain embodiments, VES-1 may include terminal functional groups, such as sulfonate groups ($SO_3^-$), phosphonate groups, carboxylic acid groups, hydroxyl groups, etc.

In certain embodiments, formula (I) may be a VES such as oleic amido propyl betaine (oleic betaine) (e.g., VES-2) with following chemical formula:

It should be noted that in certain embodiments, the VES composition 14 may include one or more viscoelastic surfactants (VES) in the presence of additional components. Accordingly, the VES (e.g., VES-1, VES-2, or combination thereof) may range from 1 to 50 wt. % of the total VES composition 14, such as from about 5 to 45 wt. %, 10 to 40 wt. %, or about 20 to 40 wt. %. For example, a VES composition 14 of VES-1 may include VES-1 in amounts ranging from about 20 to 40 wt. % of the total amount of the VES composition 14, such as about 30 to about 35 wt. %. In another example, a VES composition 14 of VES-2 may include VES-2 in amounts ranging from about 20 to 40 wt. % of the total amount of the VES composition 14.

The VES composition 14 may also include additional components that range from about 60 to 80 wt. % of the total VES composition 14. The additional components may include sodium chloride, water, organic solvents (e.g., isopropanol, propylene glycol). For example, a VES composition 14 of VES-1 may include sodium chloride, water, and/or isopropanol. Similarly, a VES composition 14 of VES-2 may include sodium chloride, water, isopropanol, and/or propylene glycol.

In certain embodiments, the nanoparticles 16 (e.g., NaSC nanoparticles) may be provided to the vessel in an amount ranging from about 0.1 weight (wt. %) to about 10 wt. % of the total amount of the viscoelastic fluid composition 18, such as about 0.5 wt. % to about 9 wt. %, about 1 wt. % to about 8 wt. %, about 2 wt. % to about 7 wt. %, about 1 wt. % to about 5 wt. %, about 2 wt. % to about 4 wt. %, or about 0.1, about 0.25, about 0.5, about 0.75, about 1, about 1.5, about 2, about 2.5, about 3, about 3.5, about 4, about 4.5, about 5, about 5.5, about 6, about 6.5, about 7, about 7.5, about 8, about 8.5, about 9, about 9.5, or about 10 wt. %. The nanoparticles 16 may include nanocellulose based particles, (VES-2)

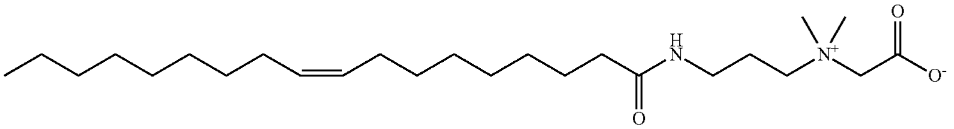

such as crystalline sodium sulfate cellulose (NaSC) nanoparticles. The NaSC nanoparticles may exhibit a size ranging from about one nanometer (nm) to about 100 nm, such as about 10 nm to about 90 nm, about 20 nm to about 80 nm, or about 30 nm to about 70 nm, such as about 10, about 20, about 30, about 40, about 50, about 60, about 70, about 80, about 90, or about 100. Preferably, the NaSC nanoparticles may exhibit a size ranging from about 30 nm to about 70 nm with a particle size distribution (D90) of about 50 nm. As described herein, particle size distribution of D90 refers to nanoparticle size value wherein 90% of the NaSC nanoparticles are smaller than 50 nm, and 10% of the NaSC nanoparticles are greater than 50 nm.

In certain embodiments, the viscoelastic fluid composition 18 including VES composition 14 at amounts ranging from about 0.1 wt. % to about 10 wt. % and a NaSC nanoparticle 16 loading ranging from about 0.1 wt. % to about 10 wt. % based on the total amount of the viscoelastic fluid composition 18 may exhibit viscosities ranging from about 90 centipoise (cP) at 100 $s^{-1}$ to about 1740 cP at 100 $s^{-1}$ at 150° F., about 32 to about 48, about 34 to about 46, about 36 to about 44, or preferably about 38 to about 42 cP.

In certain embodiments, the viscoelastic fluid composition 18 including VES composition 14 at amounts ranging In VES-2, $R_1$ may be a saturated or unsaturated hydrocarbon group ranging from 1 to 29 carbon atoms or 10 to 24 carbon atoms, such as 2, 4, 6, 8, 10, 12, 14, 16, 18, 20, 22, 24, 26, or 28 carbon atoms. In certain embodiments, $R_1$ may be 16 carbon atoms. In further embodiments, $R_1$ may be a restricted to a single chain length or may be of mixed chain length such as those groups derived from natural fats and oils or petroleum stocks.

In VES-2, each $R_2$ and $R_3$ may be independently selected from a group consisting of a straight chain alkyl (e.g., methyl group, ethyl group, propyl group, butyl group), branched alkyl, or hydroxyalkyl group ranging from 1 to 6 carbon atoms, such as from 1 to 5 carbon atoms, 1 to 4 carbon atoms, or 1 to 3 carbon atoms. Preferably, R2 and R3 are methyl groups.

In VES-2, k is an integer ranging from 1 to 20, 1 to 12, 2 to 4, or 3. One or more carbon atoms of the carbon chain with k number of carbon atoms (e.g., $CH_2$) may be saturated or unsaturated. Preferably, k is 3. In VES-2, m is an integer of from 1 to 20, 1 to 12, 1 to 6, or from 1 to 3. Preferably m is 1. In further embodiments, VES-2 may include terminal functional groups, such as carboxylic acid groups (e.g., $COO^-$), sulfonate groups, phosphonate groups, hydroxyl groups, etc.

from about 0.1 wt. % to about 10 wt. % and a NaSC nanoparticle 16 loading ranging from about 0.1 wt. % to about 10 wt. % based on the total amount of the viscoelastic fluid composition 18 may exhibit viscosities ranging from about 90 cP at 100 $s^{-1}$ to about 1750 cP at 100 $s^{-1}$ at 200° F., about 600 to about 1650, about 700 to about 1600, about 800 to about 1500, about 900 to about 1400, about 1000 to about 1300, preferably about 540 to about 1740, or such as about 100, about 200, about 300, about 400, about 500, about 600, about 700, about 800, about 900, about 1000, about 1100, about 1200, about 1300, about 1400, about 1500, about 1600, about 1700, or about 1750 cP.

In certain embodiments, the viscoelastic fluid composition 18 including VES composition 14 at amounts ranging from about 0.1 wt. % to about 10 wt. % and a NaSC nanoparticle 16 loading ranging from about 0.1 wt. % to about 10 wt. % based on the total amount of the viscoelastic fluid composition 18 may exhibit viscosities ranging from about 100 cP at 100 $s^{-1}$ to about 1100 cP at 100 $s^{-1}$ at 250° F., about 200 to about 1000, about 300 to about 900, about 400 to about 700, about 500 to about 600, preferably about 750 to about 1080 cP, or such as about 100, about 200, about 300, about 400, about 500, about 600, about 700, about 800, about 900, about 1000, or about 1100 cP.

In certain embodiments, the viscoelastic fluid composition 18 including VES composition 14 at amounts ranging from about 0.1 wt. % to about 10 wt. % and a NaSC nanoparticle 16 loading ranging from about 0.1 wt. % to about 10 wt. % based on the total amount of the viscoelastic fluid composition 18 may exhibit viscosities ranging from about 90 cP at 100 $s^{-1}$ to about 1100 cP at 100 $s^{-1}$ at 300° F., about 200 to about 1000, about 300 to about 900, about 400 to about 700, about 500 to about 600, preferably about 700 to about 1000 cP, or such as about 90, about 100, about 200, about 300, about 400, about 500, about 600, about 700, about 800, about 900, about 1000, or about 1100 cP.

In certain embodiments, the viscoelastic fluid composition 18 including VES composition 14 at amounts ranging from about 0.1 wt. % to about 10 wt. % and a NaSC nanoparticle 16 loading ranging from about 0.1 wt. % to about 10 wt. % based on the total amount of the viscoelastic fluid composition 18 may exhibit viscosities ranging from about 40 cP at 100 $s^{-1}$ to about 785 cP at 100 $s^{-1}$ at 350° F., about 50 to about 750, about 75 to about 725, about 100 to about 700, about 125 to about 675, about 150 to about 650, about 175 to about 625, about 200 to about 600, about 225 to about 575, about 250 to about 550, about 275 to about 525, about 300 to about 500, about 325 to about 475, about 350 to about 450, about 375 to about 425, preferably about 490 to about 785 cP, such as about 40, about 50, about 75, about 100, about 125, about 150, about 175, about 200, about 225, about 250, about 275, about 300, about 325, about 350, about 375, about 400, about 425, about 450, about 475, about 500, about 525, about 550, about 575, about 600, about 625, about 650, about 675, about 700, about 725, about 750, 775, or about 785.

In certain embodiments, the viscoelastic fluid composition 18 including VES-1 at 4 wt. % loading of the nanoparticle 16 may exhibit viscosities ranging from about 1625 cP at 100 $s^{-1}$ to about 1740 cP at 100 $s^{-1}$ at 200° F., about 1627 to about 1738 cP, about 1629 to about 1736 cP, about 1631 to about 1734 cP, or preferably about 1632 to about 1732 cP.

In certain embodiments, the viscoelastic fluid composition 18 including VES-1 at 4 wt. % loading of the nanoparticle 16 may exhibit viscosities ranging from about 1040 cP at 100 $s^{-1}$ to about 1080 cP at 100 $s^{-1}$ at 250° F., about 1042 to about 1078, about 1044 to about 1076, about 1046 to about 1074, about 1048 to about 1072, or preferably about 1050 to about 1070 cP.

In certain embodiments, the viscoelastic fluid composition 18 including VES-1 at 4 wt. % loading of the nanoparticle 16 may exhibit viscosities ranging from about 845 cP at 100 $s^{-1}$ to about 1000 cP at 100 $s^{-1}$ at 300° F., about 847 to about 998, about 849 to about 996, about 851 to about 994, about 853 to about 992, or preferably about 855 to about 990 cP.

In certain embodiments, the viscoelastic fluid composition 18 including VES-1 at 4 wt. % loading of the nanoparticle 16 may exhibit viscosities ranging from about 490 cP at 100 $s^{-1}$ to about 785 cP at 100 $s^{-1}$ at 350° F., about 492 to about 783, about 494 to about 781, about 496 to about 779, about 498 to about 777, or preferably about 500 to about 775 cP.

In certain embodiments, the viscoelastic fluid composition 18 including VES-2 at 4 wt. % loading of the nanoparticle 16 may exhibit viscosities ranging from about 540 cP at 100 $s^{-1}$ to about 805 cP at 100 $s^{-1}$ at 200° F., about 542 to about 803, about 544 to about 801, about 544 to about 799, about 546 to about 797, or preferably about 550 to about 795 cP.

In certain embodiments, the viscoelastic fluid composition 18 including VES-2 at 4 wt. % loading of the nanoparticle 16 may exhibit viscosities ranging from about 750 cP at 100 $s^{-1}$ to about 810 cP at 100 $s^{-1}$ at 250° F., about 752 to about 808, about 754 to about 806, about 756 to about 804, about 758 to about 802, or preferably about 760 to about 800 cP.

In certain embodiments, the viscoelastic fluid composition 18 including VES-2 at 4 wt. % loading of the nanoparticle 16 may exhibit viscosities ranging from about 640 cP at 100 $s^{-1}$ to about 725 cP at 100 $s^{-1}$ at 300° F., about 642 to about 723, about 644 to about 721, about 646 to about 719, about 648 to about 717, or preferably about 650 to about 715 cP.

In certain embodiments, the viscoelastic fluid composition 18 including VES-2 at 4 wt. % loading of the nanoparticle 16 may exhibit viscosities ranging from about 515 cP at 100 $s^{-1}$ to about 590 cP at 100 $s^{-1}$ at 350° F., about 517 to about 588, about 519 to about 586, about 521 to about 584, about 523 to about 582, or preferably about 525 to about 580 cP.

In certain embodiments, the viscoelastic fluid composition 18 including VES-1 at 2 wt. % loading of nanoparticle 16 may exhibit viscosities ranging from about 590 cP at 100 $s^{-1}$ to about 660 cP at 100 $s^{-1}$ at 200° F., about 592 to about 658, about 594 to about 656, about 596 to about 654, about 598 to about 652, about or preferably about 600 to about 650 cP.

In certain embodiments, the viscoelastic fluid composition 18 including VES-1 at 2 wt. % loading of nanoparticle 16 may exhibit viscosities ranging from about 215 cP at 100 $s^{-1}$ to about 260 cP at 100 $s^{-1}$ at 250° F., about 217 to about 258, about 219 to about 256, about 221 to about 254, about 223 to about 252, or preferably about 225 to about 250 cP.

In certain embodiments, the viscoelastic fluid composition 18 including VES-1 at 2 wt. % loading of nanoparticle 16 may exhibit viscosities ranging from about 140 cP at 100 $s^{-1}$ to about 210 cP at 100 $s^{-1}$ at 300° F., about 142 to about 208, about 144 to about 206, about 146 to about 204, about 148 to about 202, or preferably about 150 to about 200 cP.

In certain embodiments, the viscoelastic fluid composition 18 including VES-1 at 2 wt. % loading of nanoparticle 16 may exhibit viscosities ranging from about 40 cP at 100

$s^{-1}$ to about 160 cP at 100 $s^{-1}$ at 350° F., about 42 to about 158, about 44 to about 156, about 46 to about 154, about 48 to about 152, or preferably about 50 to about 150 cP.

In certain embodiments, the viscoelastic fluid composition 18 including VES-2 at 2 wt. % loading of nanoparticle 16 may exhibit viscosities ranging from about 90 cP at 100 $s^{-1}$ to about 100 cP at 100 $s^{-1}$ at 200° F., about 91 to about 99, about 93 to about 97, or preferably about 95 to about 97 cP.

In certain embodiments, the viscoelastic fluid composition 18 including VES-2 at 2 wt. % loading of nanoparticle 16 may exhibit viscosities ranging from about 100 cP at 100 $s^{-1}$ to about 125 cP at 100 $s^{-1}$ at 250° F., about 102 to about 122, about 104 to about 120, about 106 to about 118, about 110 to about 116, or preferably about 110 to about 115 cP.

In certain embodiments, the viscoelastic fluid composition 18 including VES-2 at 2 wt. % loading of nanoparticle 16 may exhibit viscosities ranging from about 90 cP at 100 $s^{-1}$ to about 130 cP at 100 $s^{-1}$ at 300° F., about 92 to about 128, about 94 to about 126, about 96 to about 124, about 98 to about 122, or preferably about 100 to about 120 cP.

In certain embodiments, the viscoelastic fluid composition 18 including VES-2 at 2 wt. % loading of nanoparticle 16 may exhibit viscosities ranging from about 56 cP at 100 $s^{-1}$ to about 85 cP at 100 $s^{-1}$ at 350° F., about 58 to about 83, about 60 to about 81, about 62 to about 79, about 64 to about 77, or preferably about 66 to about 75 cP.

Figure 2:
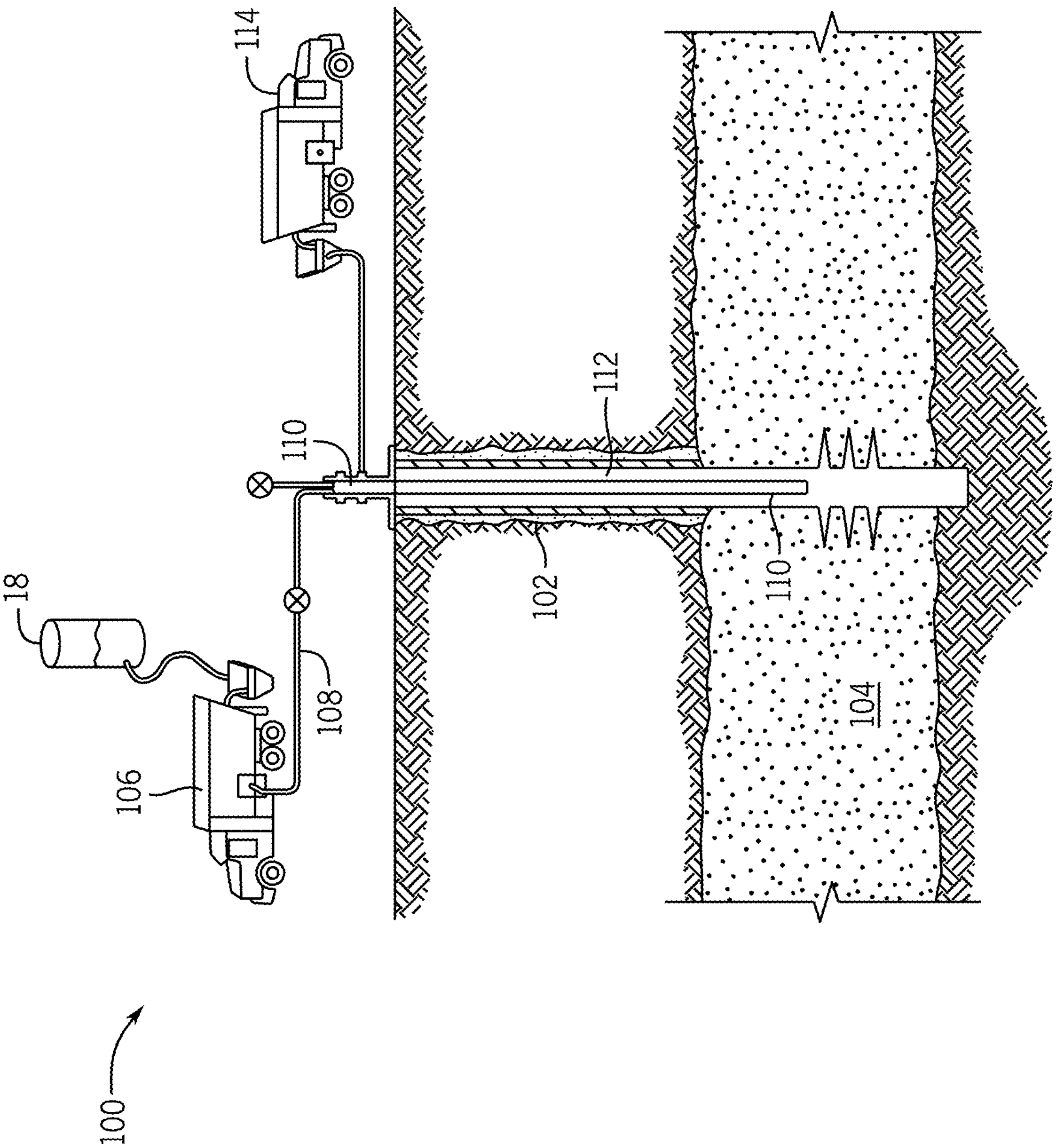
FIG. 2 is an example system to treat a wellbore and/or a formation fluidly coupled to the wellbore using the viscoelastic fluid composition, in accordance with the present disclosure.

Referring to the process, at block 20, the viscoelastic fluid composition 18 may be provided to a wellbore to treat a subterranean formation, which is further described in FIG. 2. The viscoelastic fluid composition 18 may be provided to the wellbore and/or a formation (e.g., natural fractures, channels, fissures, high permeability strikes) within the wellbore to plug undesirable zones via one or more vessels (e.g., tubings). The formations/zones may be fluidly coupled to the wellbore. Accordingly, the viscoelastic fluid composition 18 may be injected into the wellbore and/or the formation via the one or more vessels such that it may plug the undesirable zones/formations and/or reduce the flow of water. By plugging the undesirable zones (e.g., high permeability zones, water flow in fractures) using the viscoelastic fluid composition 18, additional treatment fluids may be subsequently injected into the wellbore and accurately directed to low-permeability zones, thereby increasing oil recovery and sweeping efficiency.

In certain embodiments, additional additives and/or oilfield treatment fluids may be provided to a wellbore in the presence of and/or independently from the viscoelastic fluid composition 18. The additives may include any additive known in the art, including but not limited to, friction reducers, corrosion inhibitors, iron reducing agents, surfactants and/or wetting agents, particulates, acid retardants, organic acids, chelating agents, energizing agents (e.g. $CO_2$ or $N_2$), gas generating agents, solvents, emulsifying agents, flowback control agents, resins, breakers, non-polysaccharide based viscosifying agents, or combinations thereof.

Accordingly, mixing the VES composition 14 with the NaSC nanoparticles 16 generates the viscoelastic fluid composition 18. The viscoelastic fluid composition 18 described herein presents several advantages, including but not limited to, enhanced viscosity properties at varying temperatures, when the VES composition 14 and NaSC nanoparticles 16 are mixed at certain amounts (which is discussed further below in FIGS. 2-4). It should be noted that the viscoelastic fluid composition 18 exhibits advantageous viscosity properties without requiring the addition of high salt brine solutions (e.g., greater than 20% salt content), which are utilized to regulate viscosity properties of VES. That is, the viscoelastic fluid composition 18 may be utilized in the presence of water without requiring additional brine solutions, thereby demonstrating its advantageous properties when utilized to plug thief zones (e.g., water shut-off) in a wellbore.

With the foregoing in mind, FIG. 2 is an example system 100 that may be used to treat a wellbore 102 and/or a formation 104 fluidly coupled to the wellbore 102 using the viscoelastic fluid composition 18. The formation 104 may be any type of formation with a bottom hole temperature up to about 204° C. (400° F.). For example, the temperature may be about 38° C. (100° F.), such as ranging from about 38° C. to about 204° C. In the illustrated diagram, the wellbore 102 is depicted as a vertical, cased and cemented wellbore 102, having perforations providing fluid communication between the formation 104 and the interior of the wellbore 102. However, the particular features of the wellbore 102 are not limiting, and the example provides an example context 100 for a procedure.

The system 100 may include a high-pressure pump 106 having a source of the viscoelastic fluid composition 18, as described herein. The high-pressure pump 106 may be fluidly coupled to the wellbore 102, through high-pressure lines 108 in the example. The example system 100 includes tubing 110 (e.g., one or more vessels) in the wellbore 102. It should be noted that the tubing 110 may be optional and non-limiting. In various embodiments, the tubing 110 may be omitted, a coiled tubing unit (not shown) may be present, and/or the high-pressure pump 106 may be fluidly coupled to the casing or annulus 112. The tubing or casing may be made of steel.

In certain embodiments, one or more additives may be added to the wellbore 102 and/or the formation 104 in addition to the viscoelastic fluid composition 18 to provide, or as a part of, an oilfield treatment fluid. Additives may be added at a blender, at a mixing tub of the high-pressure pump 106, and/or by any other method. For example, the additives may be co-fed or fed separately from the viscoelastic fluid composition 18.

The high-pressure pump 106 can treat (e.g., plug) the wellbore 102 and/or the formation 104, for example by positioning fluid therein, by injecting the fluid into the wellbore 102, and/or by injecting the fluid into the formation 104. Example and non-limiting operations include any oilfield treatment fluids without limitation. Potential fluid flows include flowing from the high-pressure pump 106 into the tubing 110, into the formation 104, and/or into the annulus 112. The viscoelastic fluid composition 18 may be recirculated out of the well before entering the formation 104, for example utilizing a back side pump 114.

Referring still to FIG. 2, the annulus 112 may be in fluid communication with the tubing 110. In various embodiments, the annulus 112 and the tubing 110 may be isolated (e.g. with a packer). Another example fluid flow may include flowing the viscoelastic fluid composition 18 and/or additional additives into the formation 104 at a matrix rate (e.g. a rate at which the formation is able to accept fluid flow through normal porous flow) and/or at a rate that produces a pressure exceeding a hydraulic fracturing pressure. The fluid flow into the formation 104 may be either flowed back out of the formation 104, and/or flushed away from the near wellbore 102 area with a follow up fluid. Fluid flowed to the formation 104 may be flowed to a pit or containment, back into a fluid tank, prepared for treatment, and/or managed in any other manner known in the art. Accordingly, the viscoelastic fluid composition 18 may be injected into the wellbore 102 and/or the formation 104 via the tubing 110 such that it may plug the undesirable zones/formations 104 and/or reduce the flow of water, thereby increasing oil recovery and sweeping efficiency.

Examples

Figure 3:
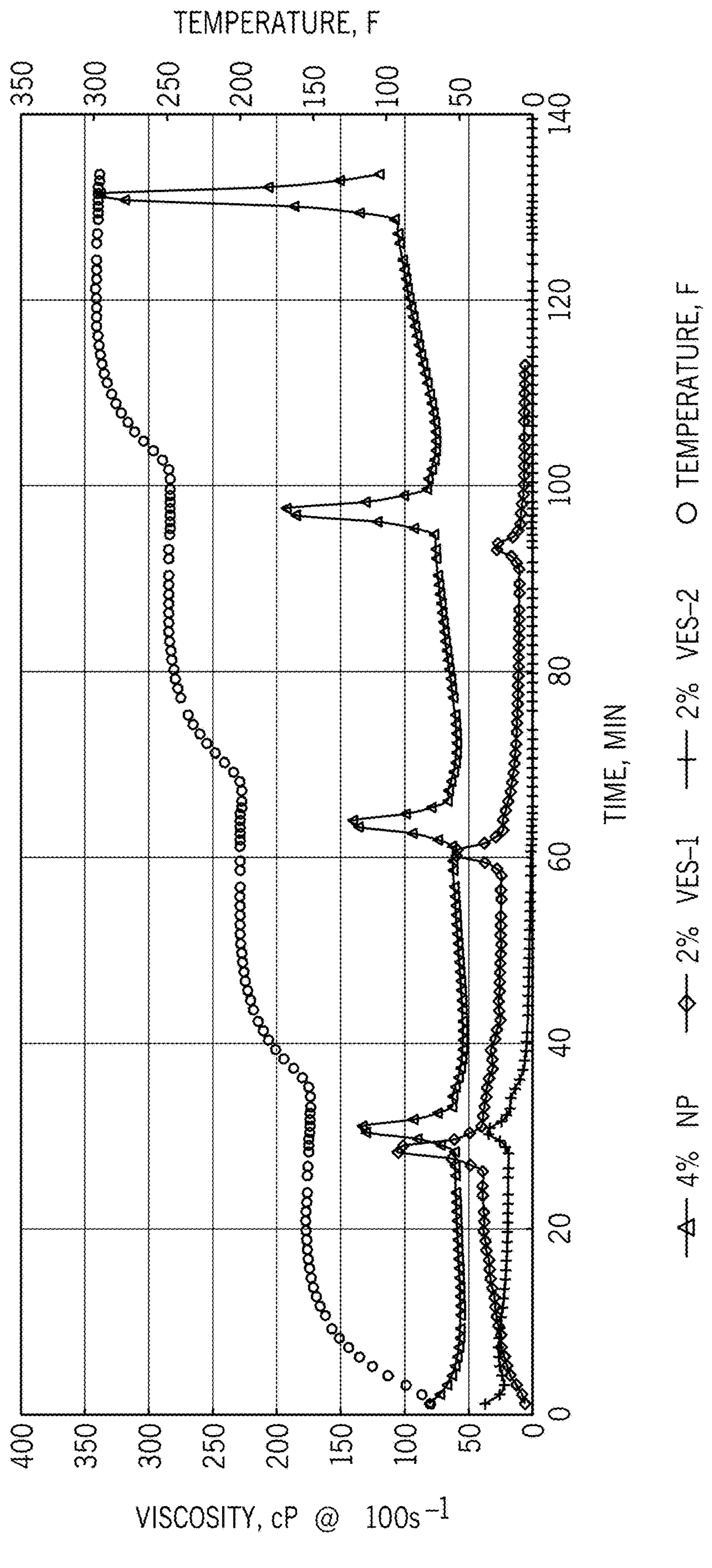
FIG. 3 is a graph showing viscosity properties of VES-1, VES-2, and nanoparticles, in accordance with embodiments of the present disclosure.

The viscosity properties of the VES composition 14 (e.g., VES-1, VES-2) and NaSC nanoparticles 16 were individually evaluated, as shown in FIG. 3. The individual components (e.g., VES-1, VES-2, NaSC nanoparticles 16) were mixed in water, respectively, at room temperature using a Waring blender connected to a variable voltage transformer. Each individual sample was mixed at 40% of the total scale of the voltage transformer, which is about 4000 rpm. The individual sample was subsequently centrifuged at 3000 rpm for 30 minutes to eliminate any air bubbles trapped in the sample during the mixing in water. The sample was loaded into Grace 5600 HP/HT rheometer to measure the viscosity following a temperature ramp between 150-300° F.

FIG. 3 is a graph showing viscosity properties of VES-1, VES-2, and the NaSC nanoparticles 16. The viscosity properties of VES-1, VES-2, and the NaSC nanoparticles 16 were tested independently in deionized (DI) water. Overall, FIG. 3 demonstrates that VES-1, VES-2, and the NaSC nanoparticles 16 individually exhibit poor viscosity properties. FIG. 3 includes a circle-shaped line representing the temperature ramping during the experiment. A sample including the NaSC nanoparticles 16 at 4 wt. % (triangle-shaped line) concentration showed a maximum viscosity of 100 cP at 300° F. A sample including 2 wt. % of VES-1 (diamond-shaped line) showed a maximum viscosity of 40 cP at 150° F. However, at 250° F., VES-1 lost its viscosity properties, and as such, viscosity data was unable to be measured. A sample including 2 wt. % VES-2 (cross-shaped line) exhibit lower viscosity than VES-1 and lost its viscosity properties at 200° F. In any case, FIG. 3 shows that VES-1, VES-2, and the NaSC nanoparticles 16 individually exhibit poor viscosity properties and/or lose viscosity.

Figure 4:
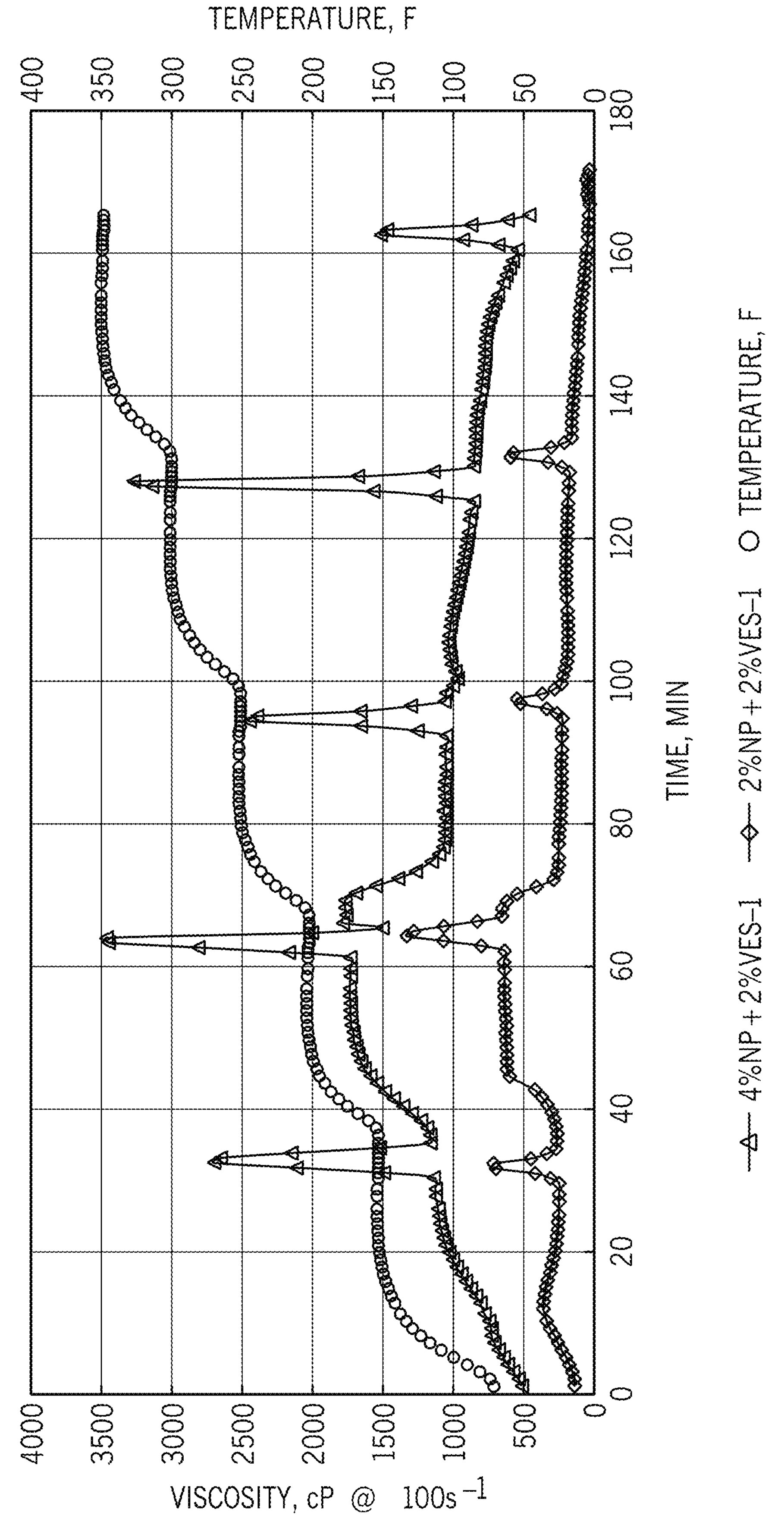
FIG. 4 is a graph showing viscosity properties of a viscoelastic fluid composition including VES-1 and nanoparticles, in accordance with embodiments of the present disclosure.

As described herein, the combination of the VES composition 14 and the NaSC nanoparticles 16 provides a synergistic effect. To illustrate this, FIG. 4 is a graph showing viscosity properties of a viscoelastic fluid composition 18 including VES-1 and nanoparticles 16. The NaSC nanoparticles 16 and VES-1 (erucic sulfobetaine) were combined at two different ratios in DI-water, and rheology tests were performed as described above in FIG. 3. The pH of the viscoelastic fluid compositions 18 was in the range between 6-8. No efforts were made to adjust the final viscoelastic fluid composition 18 to a particular pH. FIG. 4 includes a circle-shaped line representing the temperature ramping during the experiment. A first mixture (e.g., viscoelastic fluid composition 18) including a combination of 4 wt. % NaSC nanoparticles and 2 wt. % VES-1 (triangle-shaped line in FIG. 4) exhibited a significant increase in fluid viscosity at each temperature. For example, a maximum viscosity of 1755 cP was observed at 200° F. and a viscosity of 1000 cP was also observed at 300° F. Furthermore, the viscoelastic fluid composition 18 including 4 wt. % NaSC nanoparticles and 2 wt. % VES-1 exhibited superior viscosity properties at high temperatures (e.g., 500 cP at 350° F.). These results demonstrate that the combination of the NaSC nanoparticles 16 and VES-1 synergistically provide gel-like characteristics (e.g., highly viscous behaviors) of the resulting viscoelastic fluid composition 18, which surprisingly contrasts with the viscosity properties of the NaSC nanoparticles 16 and VES-1 when evaluated individually (as shown in FIG. 3).

A second mixture (diamond-shaped line) was also evaluated for its viscosity properties. In particular, the nanoparticle (NP) load was reduced to 2% instead of 4% and VES-1 was maintained at 2 wt. %. FIG. 4 demonstrates that the second mixture was less viscous compared to the first mixture. Accordingly, these results suggest that the synergy between the NaSC nanoparticles 16 and VES-1 may not occur at all mixing combinations or otherwise the degree of the synergy varies for different NP loadings. Put differently, the viscosity properties of the viscoelastic fluid composition 18 correspond to the synergy between the NaSC nanoparticles 16 and VES-1, which is associated with a certain optimized ratio of an amount of NaSC nanoparticles 16 and an amount of VES-1. Furthermore, salt (e.g., brine composition) is often provided alongside viscoelastic surfactants to achieve a certain viscosity and/or gel-like characteristics. For example, salts such as NaCl or $NH_4Cl$ may be utilized to achieve a certain ionic strength such that charges associated with headgroups of the viscoelastic surfactants may be counteracted, thereby enabling packing of the VES molecules (e.g., promote formation of wormlike micelles). However, the present embodiments demonstrate that the disclosed viscoelastic fluid composition 18 exhibit high viscosity without the addition of salt. That is, the formation of worm-like micelles of the VES (e.g., VES-1, VES-2) within the viscoelastic fluid composition 18 is facilitated by the presence of the NASC nanoparticles 16 in the absence of a high salt environment. This provides additional advantages, including but not limited to, enabling the use of the disclosed viscoelastic fluid compositions 18 in fresh water, as it can maintain high viscosity in environments that lack salt (e.g., in the absence of salt in fresh water) and/or without the addition of a brine solution. In any case, FIG. 4 demonstrates that the disclosed viscoelastic fluid composition 18 with its gel-like characteristics can plug (e.g. shut off) flow in fractures or high permeability strikes in carbonate formations without requiring additional solutions (e.g., brine solutions). Accordingly, the NaSC nanoparticles 16 and VES-1 exhibit a strong synergy when utilized in the viscoelastic fluid composition 18.

Figure 5:
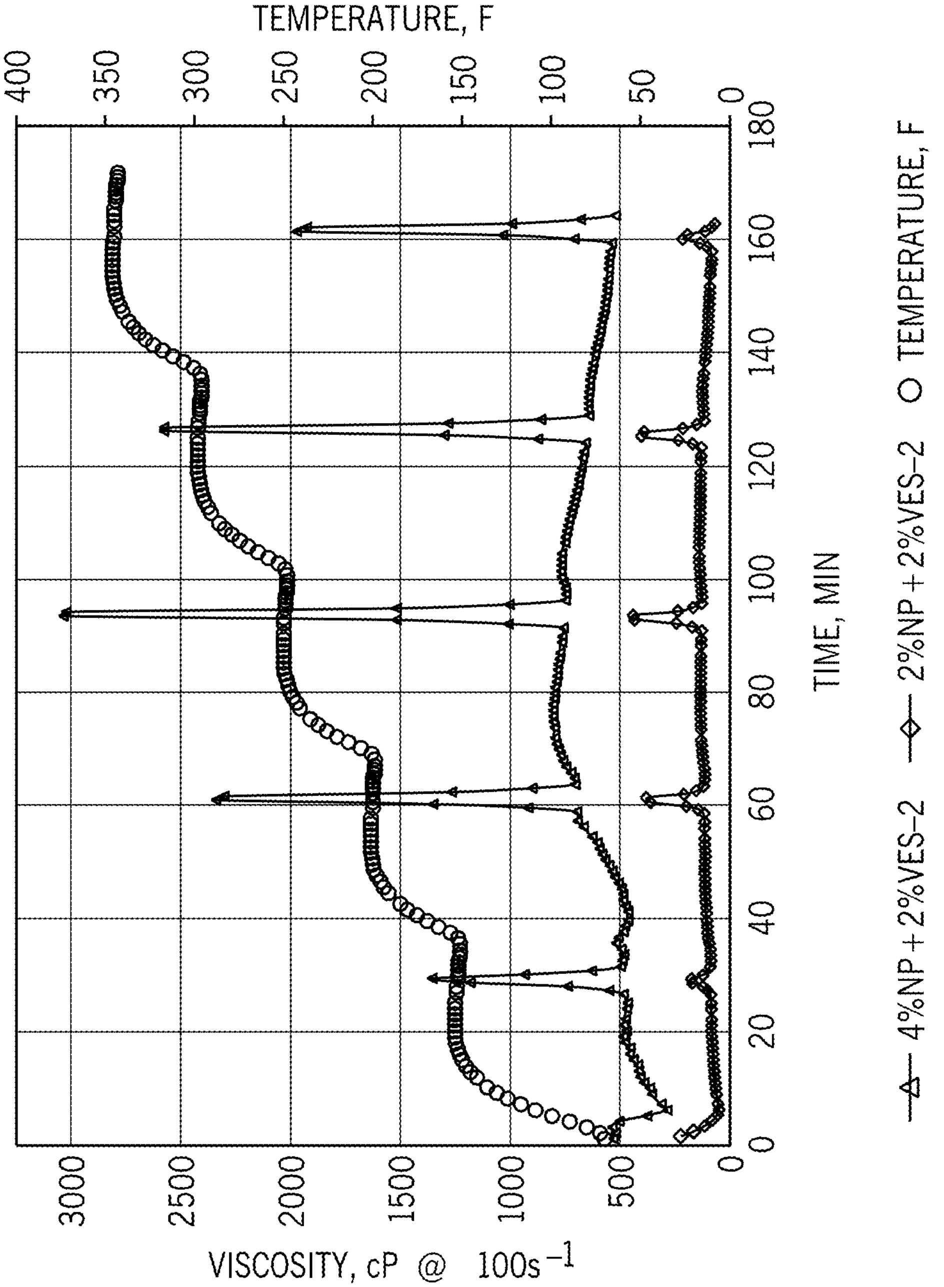
FIG. 5 is a graph showing viscosity properties of a viscoelastic fluid composition including VES-2 and nanoparticles, in accordance with embodiments of the present disclosure.

FIG. 5 demonstrates the synergistic effect between VES-2 and the NaSC nanoparticles 16. In particular, FIG. 5 is a graph showing viscosity properties of a viscoelastic fluid composition 18 including VES-2 and NaSC nanoparticles 16. Betaines with similar hydrocarbon chain length to VES-2 are not believed to show good viscosity or gel build up as standalone surfactant, even in high salinity brines. Accordingly, the NaSC nanoparticles 16 and VES-2 (oleic amido propyl betaine) were combined at two different ratios in DI-water, and rheology tests were performed as described above in FIG. 3. The pH of the viscoelastic fluid compositions 18 was in the range between 6-8. No efforts were made to adjust the final viscoelastic fluid composition 18 to a particular pH. FIG. 5 includes a circle-shaped line representing the temperature ramping during the experiment. Overall, FIG. 5 illustrates that the combination of NaSC nanoparticles 16 with VES-2 exhibits an increase in viscosity compared to the individual components as shown in FIG. 3. For example, a first mixture including 4 wt. % NP and 2 wt. % VES-2 (triangle-shaped-line) exhibited a maximum viscosity of 800 cP at 250° F., and a viscosity of 500 cP was observed at 350° F. A reduction in the NP load to 2% while maintaining the VES-2 load at 2% resulted in lower viscosity across all temperatures. These results suggest that a certain optimized ratio of an amount of NaSC nanoparticles 16 and an amount of VES-2 synergistically produce a viscoelastic fluid composition 18 that exhibits superior viscosity properties. Moreover, these results indicate that the viscoelastic fluid compositions 18 are able to maintain gel-like properties in the absence of brine solutions, thereby enabling their versatility in being utilized in the wellbore to plug formations without additional components such as brine.

The technical effect of the disclosed embodiments is directed to viscoelastic fluid compositions that include viscoelastic surfactants (VES) supported with nanoparticles (e.g., cellulose nanoparticles such as crystalline sodium sulfate cellulose (NaSC) nanoparticles) as selective water conformance fluids to promote sweeping efficiency and increase oil recovery. The combination of the VES and the nanoparticles in the viscoelastic fluid composition provides a synergistic effect such that the viscoelastic fluid composition exhibits high viscosity with gel-like characteristics. For example, the VES may be present in an amount ranging from 0.1 to 10 wt. % based on a total weight of the viscoelastic fluid composition, and the NaSC nanoparticles may be present in an amount ranging from 0.1 to 10 wt. % based on a total weight of the viscoelastic fluid composition. Accordingly, the viscoelastic fluid compositions and methods described herein present advantages at surface conditions and downhole conditions when utilized as a water conformance fluid (e.g., water shut-off) to plug undesirable zones (e.g., high permeability zones, water flow in fractures), thereby increasing oil recovery and sweeping efficiency.

The subject matter described in detail above may be defined by one or more clauses, as set forth below.

A viscoelastic fluid composition includes a viscoelastic surfactant composition ranging from about 0.1 wt. % to about 10 wt. % based on a total wt. % of the viscoelastic fluid composition, and crystalline sodium sulfate cellulose (NaSC) nanoparticles ranging from about 0.1 wt. % to about 10 wt. % based on the total wt. % of the viscoelastic fluid composition.

The viscoelastic fluid composition of the preceding claim, wherein the NaSC nanoparticles include a particle size ranging from about one nanometer (nm) to about 100 nm.

The viscoelastic fluid composition of any of the preceding claims, wherein the NaSC nanoparticles include a particle size ranging from about 30 nm to about 70 nm.

The viscoelastic fluid composition of any of the preceding claims, wherein the NaSC nanoparticles include a particle size distribution (D90) of greater than or equal to about 50 nm.

The viscoelastic fluid composition of any of the preceding claims, wherein the viscoelastic surfactant composition includes one or more viscoelastic surfactants having the formula:

(I)

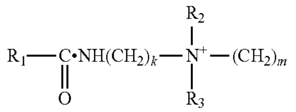

where $R_1$ may be a saturated or unsaturated hydrocarbon group ranging from 1 to 29 carbon atoms, $R_2$ and $R_3$ may be independently selected from a group consisting of a hydrogen atom, straight chain alkyl, branched alkyl, or hydroxyalkyl group ranging from 1 to 6 carbon atoms, k is an integer ranging from 1 to 20, and m is an integer ranging from 1 to 20.

The viscoelastic fluid composition of any of the preceding claims wherein the one or more viscoelastic surfactants have the formula:

(VES-1)

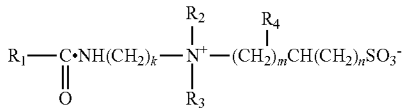

where $R_4$ is selected from a group consisting of hydrogen atom, hydroxyl, alkyl, or hydroxyalkyl groups ranging from 1 to 4 carbon atoms, and n is an integer ranging from 0 to 20.

The viscoelastic fluid composition of any of the preceding claims, wherein the viscoelastic surfactant composition includes oleic amido propyl betaine.

The viscoelastic fluid composition of any of the preceding claims including 20 wt. % to about 40 wt. % of the one or more viscoelastic surfactants based on a total weight of the viscoelastic surfactant composition.

The viscoelastic fluid composition of any of the preceding claims including a viscosity ranging from about 90 centipoise (cP) to about 1750 cP at 100 $s^{-1}$ at 200° F.

The viscoelastic fluid composition of any of the preceding claims, including a viscosity ranging from about 90 cP to about 1100 cP at 100 $s^{-1}$ at 300° F.

The viscoelastic fluid composition of any of the preceding claims including a viscosity ranging from about 40 cP to about 785 cP at 100 $s^{-1}$ at 350° F.

The viscoelastic fluid composition of any of the preceding claims, wherein the viscoelastic surfactant composition ranges from about 1 wt. % to about 3 wt. % based on the total wt. % of the viscoelastic fluid composition, and wherein the NaSC nanoparticles range from about 1 wt. % to about 5 wt. % based on the total wt. % of the viscoelastic fluid composition.

The viscoelastic fluid composition of any of the preceding claims, wherein the viscoelastic surfactant composition further includes sodium chloride, water, organic solvents, or a combination thereof.

The viscoelastic fluid composition of any of the preceding claims, wherein the organic solvents include isopropanol, propylene glycol, or a combination thereof.

A system comprising one or more vessels containing the viscoelastic treatment fluid composition of any of the preceding claims, wherein the one or more vessels are disposed within a subterranean formation.

A method includes mixing a viscoelastic surfactant composition and NaSC nanoparticles to form a viscoelastic fluid composition including the viscoelastic surfactant composition ranging from about 0.1 wt. % to about 10 wt. % based on a total wt. % of the viscoelastic fluid composition, and the NaSC nanoparticles ranging from about 0.1 wt. % to about 10 wt. % based on the total wt. % of the viscoelastic fluid composition. The method further includes providing the viscoelastic fluid composition to a wellbore to treat a subterranean formation.

The method of the preceding claim, wherein the viscoelastic fluid composition comprises a fluid viscosity at 200° F. ranging from about 90 cP to about 1750 cP.

The method of any of the preceding claims, wherein the viscoelastic fluid composition plugs water flow in fractures, high permeability zones, or a combination thereof, in carbonate formations of the subterranean formation to reduce water flow.

A system includes one or more vessels disposed in a subterranean formation, wherein the one or more vessels contain a viscoelastic fluid composition including a viscoelastic surfactant composition ranging from about 0.1 wt. % to about 10 wt. % based on a total wt. % of the viscoelastic fluid composition, and crystalline sodium sulfate cellulose (NaSC) nanoparticles ranging from about 0.1 wt. % to about 10 wt. % based on the total wt. % of the viscoelastic fluid composition.

The system of the preceding claim, wherein the NaSC nanoparticles include a particle size ranging from about 30 nm to about 70 nm.

The system of any of the preceding claims, wherein the viscoelastic surfactant composition includes one or more viscoelastic surfactants having the formula:

(I)

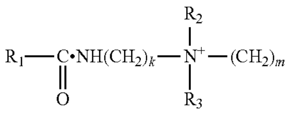

where $R_1$ may be a saturated or unsaturated hydrocarbon group ranging from 1 to 29 carbon atoms, $R_2$ and $R_3$ may be independently selected from a group consisting of a hydrogen atom, straight chain alkyl, branched alkyl, or hydroxyalkyl group ranging from 1 to 6 carbon atoms, k is an integer ranging from 1 to 20, and m is an integer ranging from 1 to 20.

The specific embodiments described above have been illustrated by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. A viscoelastic fluid composition comprising:

a viscoelastic surfactant composition ranging from about 0.1 wt. % to about 10 wt. % based on a total wt. % of the viscoelastic fluid composition, wherein the viscoelastic surfactant composition is selected from a group consisting of betaines, modified betaines, alkylamidobetaines, sultaines, modified sultaines, alkylamidopropyl sultaines, and combinations thereof; and crystalline sodium sulfate cellulose (NaSC) nanoparticles ranging from about 0.1 wt. % to about 10 wt. % based on the total wt. % of the viscoelastic fluid composition.

2. The viscoelastic fluid composition of claim 1, wherein the NaSC nanoparticles comprise a particle size ranging from about one nanometer (nm) to about 100 nm.

3. The viscoelastic fluid composition of claim 1, wherein the NaSC nanoparticles comprise a particle size ranging from about 30 nm to about 70 nm.

4. The viscoelastic fluid composition of claim 1, wherein the NaSC nanoparticles comprise a particle size distribution (D90) of greater than or equal to about 50 nm.

5. The viscoelastic fluid composition of claim 1, wherein the viscoelastic surfactant composition comprises one or more viscoelastic surfactants having the formula:

(I)

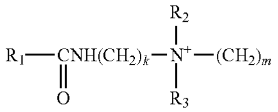

where $R_1$ may be a saturated or unsaturated hydrocarbon group ranging from 1 to 29 carbon atoms, $R_2$ and $R_3$ may be independently selected from a group consisting of a hydrogen atom, straight chain alkyl, branched alkyl, or hydroxyalkyl group ranging from 1 to 6 carbon atoms, k is an integer ranging from 1 to 20, and m is an integer ranging from 1 to 20.

6. The viscoelastic fluid composition of claim 5, wherein the one or more viscoelastic surfactants have the formula:

(VES-1)

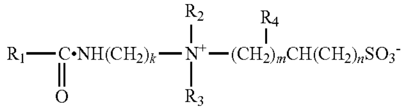

where $R_4$ is selected from a group consisting of hydrogen atom, hydroxyl, alkyl, or hydroxyalkyl groups ranging from 1 to 4 carbon atoms, and n is an integer ranging from 0 to 20.

7. The viscoelastic fluid composition of claim 6, comprising 20 wt. % to about 40 wt. % of the one or more viscoelastic surfactants based on a total weight of the viscoelastic surfactant composition.

8. The viscoelastic fluid composition of claim 1, wherein the viscoelastic surfactant composition comprises oleic amido propyl betaine.

9. The viscoelastic fluid composition of claim 1, comprising a viscosity ranging from about 90 centipoise (cP) to about 1750 cP at 100 $s^{-1}$ at 200° F.

10. The viscoelastic fluid composition of claim 1, comprising a viscosity ranging from about 90 cP to about 1100 cP at 100 $s^{-1}$ at 300° F.

11. The viscoelastic fluid composition of claim 1, comprising a viscosity ranging from about 40 cP to about 785 cP at 100 $s^{-1}$ at 350° F.

12. The viscoelastic fluid composition of claim 1, wherein the viscoelastic surfactant composition ranges from about 1 wt. % to about 3 wt. % based on the total wt. % of the viscoelastic fluid composition, and wherein the NaSC nanoparticles range from about 1 wt. % to about 5 wt. % based on the total wt. % of the viscoelastic fluid composition.

13. The viscoelastic fluid composition of claim 1, wherein the viscoelastic surfactant composition further comprises sodium chloride, water, organic solvents, or a combination thereof.

14. The viscoelastic fluid composition of claim 13, wherein the organic solvents comprise isopropanol, propylene glycol, or a combination thereof.

15. A system comprising one or more vessels containing the viscoelastic fluid composition of claim 1, wherein the one or more vessels are disposed within a subterranean formation.

16. A method comprising:

mixing a viscoelastic surfactant composition and NaSC nanoparticles to form a viscoelastic fluid composition comprising:

the viscoelastic surfactant composition ranging from about 0.1 wt. % to about 10 wt. % based on a total wt. % of the viscoelastic fluid composition, wherein the viscoelastic surfactant composition is selected from a group consisting of betaines, modified betaines, alkylamidobetaines, sultaines, modified sultaines, alkylamidopropyl sultaines, and combinations thereof; and the NaSC nanoparticles ranging from about 0.1 wt. % to about 10 wt. % based on the total wt. % of the viscoelastic fluid composition; and providing the viscoelastic fluid composition to a wellbore to treat a subterranean formation.

17. The method of claim 16, wherein the viscoelastic fluid composition comprises a fluid viscosity at 200° F. ranging from about 90 cP to about 1750 cP.

18. The method of claim 16, wherein the viscoelastic fluid composition plugs water flow in fractures, high permeability zones, or a combination thereof, in carbonate formations of the subterranean formation to reduce water flow.

19. A system comprising:

one or more vessels disposed in a subterranean formation, wherein the one or more vessels contain a viscoelastic fluid composition comprising:

a viscoelastic surfactant composition ranging from about 0.1 wt. % to about 10 wt. % based on a total wt. % of the viscoelastic fluid composition, wherein the viscoelastic surfactant composition is selected from a group consisting of betaines, modified betaines, alkylamidobetaines, sultaines, modified sultaines, alkylamidopropyl sultaines, and combinations thereof; and crystalline sodium sulfate cellulose (NaSC) nanoparticles ranging from about 0.1 wt. % to about 10 wt. % based on the total wt. % of the viscoelastic fluid composition.

20. The system of claim 19, wherein the NaSC nanoparticles comprise a particle size ranging from about 30 nm to about 70 nm.

21. The system of claim 19, wherein the viscoelastic surfactant composition comprises one or more viscoelastic surfactants having the formula:

(I)

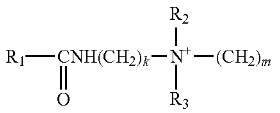

where $R_1$ may be a saturated or unsaturated hydrocarbon group ranging from 1 to 29 carbon atoms, $R_2$ and $R_3$ may be independently selected from a group consisting of a hydrogen atom, straight chain alkyl, branched alkyl, or hydroxyalkyl group ranging from 1 to 6 carbon atoms, k is an integer ranging from 1 to 20, and m is an integer ranging from 1 to 20.

* * * * *